United States Patent Office 3,520,845
Patented July 21, 1970

3,520,845
INSULATING SHEET MATERIAL COMPRISING HIGH TEMPERATURE-RESISTANT POLYMERS WITH ORIENTED INORGANIC FLAKES DISPERSED THEREIN
James J. McKeown, Mahtomedi, Minn., and Michael E. Toner, Seattle, Wash., assignors to Minnesota Mining and Manufacturing Company, St. Paul, Minn., a corporation of Delaware
No Drawing. Continuation-in-part of application Ser. No. 502,608, Oct. 22, 1965. This application May 1, 1969, Ser. No. 821,128
Int. Cl. C08g 51/04; C08k 1/02
U.S. Cl. 260—37
28 Claims

ABSTRACT OF THE DISCLOSURE

Composite sheet material suitable as electrical insulation comprised of high temperature resistant polymer containing electrically insulating inorganic flakes uniformly dispersed in the polymer and substantially oriented in the plane of the sheet, each flake being surrounded and intimately contacted by the polymer. The sheet material can withstand high operating temperatures and high electrical voltages over extended periods of time but also has good mechanical properties (e.g. toughness, strength and flexibility).

---

This is a continuation-in-part of copending patent application Ser. No. 502,608 filed Oct. 22, 1965, and now abandoned.

The present invention relates to novel sheet materials of particular use as electrical insulation.

There is an increasing need in the field of electrical insulation for materials which can withstand high operating temperatures and high electrical voltages over extended periods of time. Good mechanical properties (e.g. toughness, strength and flexibility) are also generally needed in these materials, for ease of fabrication as well as for dependability in use.

Certain high molecular weight polymers are available which maintain good mechanical and electrical properties at temperatures in excess of 200° C. and these have often been used as electrical insulating materials. However, in environments in which they are subject to high temperatures together with voltages in excess of the corona starting voltage during operation (e.g. in certain electric motor applications), they often fail because of their limited resistance to corona. Much greater resistance to corona has been achieved, on the other hand, by products containing certain inorganic flakes or platelets (e.g. of mica or glass). However, these products have relatively poor mechanical properties which make fabrication difficult and which sometimes leads to mechanical failure during use. Furthermore, the polymers and flakes have proved difficult to combine and composite constructions containing both types of materials have heretofore been relatively unsuccessful, the shortcomings of either the polymer or the inorganic flakes being present to a considerable degree.

For example, previous attempts to impregnate sheets of dielectric inorganic flakes (e.g. mica papers) with these polymers have resulted in sheets having outer layers of the polymer with the layer of the dielectric flakes remaining essentially unimpregnated between. Such structures are weak and prone to delamination in the central layer.

The present invention relates to the preparation of sheets comprising dielectric flakes uniformly distributed in and individually surrounded and intimately contacted by high performance polymers. The dielectric flakes lie substantially in the planes of these sheets. These sheets, have the excellent combination of mechanical and electrical properties previously desired but unavailable.

It is therefore an object of the invention to provide a novel and useful class of electrical insulating materials.

It is another object of the invention to provide flexible, stretchable and conformable intermediate sheets of polymer and flake-like filler.

It is another object of the invention to provide novel pressure-sensitive electrical insulation tapes.

It is a further object of the invention to provide compositions which are resistant to high voltages at high temperatures over extended periods of time.

It is a further object of the present invention to provide a method for preparing compositions of improved resistance to corona.

It is a further object of the invention to provide electrical conductors coated with compositions which have relatively long corona endurances.

Other objects of the invention will become apparent to those skilled in the art upon reading the following specification.

The present invention provides essentially void-free tough, flexible sheets useful as electrical insulating material which comprise:

(a) From about 20 to 85 parts of a hardened wholly synthetic polymer having a highly aromatic structure containing hetero linkages, a softening temperature greater than 100° C. and a weight loss as determined by thermogravimetric analysis (TGA) in flowing nitrogen with a temperature increase of 2½° C. per minute of less than 10% at 400° C. and (b) From about 80 to 15 parts of electrically insulating inorganic flakes uniformly dispersed in the polymer, the flakes being substantially oriented in the plane of the sheet and each flake being surrounded and intimately contacted by the polymer.

These are often referred to herein as the hardened sheets or films of the invention. They combine excellent mechanical properties with electrical properties which enable them to operate in high voltage, high temperature environments. They are particularly useful as electrical insulation in motor slot liners, motor phase insulations, transformers, capacitors, and coil, wire and cable wrappings. The sheets of the present invention can be prepared in any desired lengths. Normally, they are prepared in long lengths and wound into rolls.

It is of critical importance to the obtaining of the excellent mechanical properties of the sheets or films of the invention that the polymer surrounds and intimately contacts (wets) the individual flakes therein. Thus the individual flakes are separated by polymer rather than being in contact with one another. Similarly it is important to the electrical properties of the sheets that the flakes be substantially oriented in the plane thereof.

The method for determining the polymer softening temperature referred to previously is also known as the Vicat Softening point test. It is described on page 524 of volume 25 of the ASTM standards and has the test number ASTM D–1525. As used herein, the softening temperature is the temperature at which a flat ended needle having a 1 mm. by 1 mm. square cross section will penetrate a specimen (having lateral dimensions not less than 0.75 inch and a thickness of 0.125 inch) under a load of 1000 grams and a uniform temperature rise of 50° C. per hour.

The T.G.A. (thermogravimetric analysis) weight loss test used is described fully in the Armed Services Technical Information Agency document AD 275,567 entitled "Thermogravimetric Analysis of Polymers" by Ehlers. As used herein, the test is run in flowing nitrogen with a temperature increase of 2½° C. per minute.

The insulating materials of the invention are prepared by a multistep process which, however, is relatively easily carried out using conventional equipment. It involves the temporary plasticization of the polymer with a volatile species to form a material sufficiently soft so that the filler can be milled into it at moderate temperatures (preferably from about 20 to 65° C.). The milled materials are then pressed into sheets and heated to evolve residual plasticizer and to cure if necessary. More specifically, this process involves:

(a) Milling together at moderate temperature 20 to 85 parts, based on polymer solids, of a temporarily plasticized whooly synthetci polymer having a highly aromatic structure containing hetero linkages, a viscosity greater than $10^5$ poises at 25° C. and 80 to 15 parts of niorganic electrically insulating flakes, the plasticized polymer comprising (1) from about 30 to 65 parts of a wholly synthetic polymer having a softening temperature when hardened greater than 100° C. and a weight loss when hardened as determined by thermogravimetric analysis in flowing nitrogen with a temperature increase of 2½° C. per minute of less than 10% at 400° C. and
(2) from about 70 to 35 parts of a fugitive plasticizer which has a boiling point from about 40° to 300° C. and which forms a soft, pliable, viscous, homogenous mass with the polymer, (b) Continuing milling until the individual flakes are uniformly dispersed in and substantially completely surrounded and wet by the plasticized polymer, (c) Removing the filled mass from the mill, (d) Compressing the mass into a sheet in which substantially all of the flakes are oriented essentially in the plane of the sheet and (e) Subjecting the sheet to a heat cycle to harden it.

The thickness of the green sheet as it is removed from the calender or hot press in preferably not more than about 625 microns to obviate any possible difficulty in eliminating the fugitive plasticizer and obtaining the desired degree of filler orientation.

The fugitive plasticizer is substantially completely removed in step (e) above. When the polymer used in the sheet is thermoplastic, no other change normally occurs in the hardening step. In other cases, the hardening includes further chemical changes (cures), e.g. intramolecular condensations, ring formations, addition reactions, intermolecular reactions, such as crosslinking, etc. In those cases, a thermoset polymer is often formed. An additional relatively short post heating cycle (e.g. of about 5 minutes at 300–400° C. in the case of the polyimides, which are discussed hereinafter) frequently improves the physical properties of these hardened sheets of the invention.

The sheets resulting from step (d) of the process can be stored indefinitely. Furthermore, at this stage the sheets (frequently hereinafter referred to as "green" sheets) are generally flexible and extensible to a degree and can be easily slit into strips or otherwise cut, flexed, wrapped, etc. When the green sheets are wrapped around electrical conductors in overlapping relationship and hardened in place, they form tough, solid layers (the overlapped portions of the sheets adhering and fusing together upon hardening). The insulating structure which is formed has considerably greater corona life under comparable conditions than the respective polymers containing no fillers.

In other cases, it is preferable to harden the sheets prior to fabrication, particularly where conformability is not required (since the hardened sheets are flexible but lose some of the conformability of the corresponding green sheets).

The intermediate green sheets or films can be described as comprising:

(a) From about 20 to 85 parts, based on polymer solids, of a plasticized wholly synthetic polymer having a highly aromatic structure containing hetero linkages, an unfilled viscosity greater than about $10^5$ poises at 25° C. and a solids content from about 30 to 65 percent, the remainder being a fugitive plasticizer having a boiling point of from about 40 to 300° C., the synthetic polymer when hardened having a softening temperature greater than 100° C. and a weight loss as determined by thermogravimetric analysis in flowing nitrogen with a temperature increase of 2½° C. per minute of less than 10° at 400° C. and (b) From about 80 to 15 parts of electrically insulating inorganic flakes uniformly dispersed in the polymer, the flakes being substantially oriented in the plane of the sheet and each flake being surrounded and intimately contacted by the polymer.

Generally processing and product requirements determine the solid and viscosity ranges previously specified of the plasticized polymers (the viscosity being determined at 25° C. at a shear rate of 15 reciprocal seconds). Thus, the viscosity of at least $10^5$ poises at 25° C. ordinarily assures that the material will not stick to the mill rolls and the retention in the green sheets of (1) the substantial orientation of the flakes in the plane of the sheet (which is very important to the corona resistance of the sheet), (2) their uniform distribution therein and (3) the overall toughness needed in handling them during possible slitting and fabrication. The maximum viscosity of the plasticized polymer is determined largely by the ease of milling, but is generally not more than about $2 \times 10^6$ poises at 25° C., the viscosities being determined on an Instron Rheometer using a capillary having a length to diameter ratio of 66.5.

The solids content range is generally maintained as high as is convenient within the desired viscosity range to avoid the necessity of removing an excess of fugitive plasticizer during hardening of the green sheet, the wastage of the plasticizer and the unnecessary shrinkage of the product. This is not always the case, however, since in certain cases considerable shrinkage of the green sheet during hardening (e.g. to form a particularly thin or closely adhering covering on a conductor) is desired.

The polymers useful in the compositions of the present invention frequently have highly aromatic structures containing hetero linkages and include aromatic polyimides, polyamides, polysulfones, polyethers (e.g. poly (phenylene oxides)), polyesters, polythioethers, polyketones, etc. The polymers preferred for use in the invention are wholly synthetic polymers having a highly aromatic structure containing hetero linkages and are selected from aromatic polyimides, polyamides, polysulfones and polyethers.

The polyimides are the most preferred polymers in the products of the invention as sheets containing them have excellent mechanical and electrical properties. In fact, the hardened sheets prepared using polyimides and containing not more than about 40 parts of mica (and 60 parts or more of polyimide) are particularly tough, having fold endurance values of 100 cycles or more at a sheet thickness of 100 microns, as will be shown hereinafter.

Polyimides useful in the practice of the invention can be prepared, for example, by reacting a diamine having a divalent group containing at least two carbon atoms with a tetracarboxylic acid dianhydride containing a tetravalent group containing at least 2 carbon atoms, with no more than 2 carbonyl groups of the dianhydride radical being attached to any one carbon atom of the tetravalent group, whereby a polyamide (polyamic) acid composition is formed which is then converted to the polyimide by chemical or heat treatment. Reference is made to U.S. Pats. 3,179,632 and 3,179,634 and South African Pat. No. 60/1040 with respect to these polymers.

Preferably the tetracarboxylic acid dianhydride radicals contain a tetravalent group containing at least 6 carbon atoms and having benzenoid unsaturation, each of the 4 carbonyl groups of the dianhydride radical being attached to a separate carbon atom in the tetravalent group, the carbonyl groups being in pairs in which the groups in each pair are attached to adjacent carbon atoms of the tetravalent group. Another useful class of dianhydride are those containing heterocyclic rings. Illustrative of dianhydrides suitable for use in the present invention are:

2,3,6,7-naphthalene tetracarboxylic dianhydride;
3,3',4,4'-diphenyltetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl)sulfone dianhydride;
perylene 3,4,9,10-tetracarboxylic acid dianhydride;
3,3',4,4'-tetracarboxy benzophenone dianhydride.

The organic diamines useful in preparing the polyimides have the structural formula $H_2N-R'-NH_2$, wherein $R'$, is a divalent radical containing at least 2 carbon atoms, may be aromatic, heterocyclic, aliphatic, cycloaliphatic, or a combination thereof. These groups can be substituted with halo, $R''-$, $R''O-$, $R''S-$ and the like groups, wherein $R''$ is hydrocarbon containing up to six carbon atoms. The most useful diamines are the primary diamines which, upon reaction with a dianhydride, provide the polyamide-acids which are converted into the polyimides. The preferred $R'$ groups in the diamines contain benzenoid unsaturation. Among the diamines which are suitable for use in the present invention are:

5-amino-2-(p-aminophenyl)benzthiazole;
4-amino-2-(p-aminophenyl)benzthiazole;
5-amino-2-(m-aminophenyl)benzthiazole;
4-amino-2-(m-aminophenyl)benzthiazole;
5-amino-2-(p-aminophenyl)benzoxazole;
4-amino-2-(p-aminophenyl)benzoxazole;
5-amino-2-(m-aminophenyl)benzoxazole;
4-amino-2-(m-aminophenyl)benzoxazole;
2,5-diamino benzoxazole;
2,5-diamino benzthiazole; etc.

Polyamides useful in the practice of the invention can be prepared by reacting diamines such as previously defined with aromatic orthomonoanhydride-monoacid chlorides (such as the orthomonoanhydride-monoacid chloride of trimellitic acid). These polymers are embraced within the general term "polyamide" as utilized herein although they also contain polyimide groups and could also be thought of as polyimideamides.

The fugitive plasticizers hereof vary from polymer to polymer. They form soft, pliable, homogenous masses with the polymers. Generally, they are solvents for the particular polymer with which they are used. Thus benzene, toluene, xylene, diphenylether, etc. may be used with polyphenylene oxides; dimethylacetamide, dimethylformamide and dimethyl sulfoxide with polysulfones; dimethyl formamide, dimethyl acetamide and N-methyl pyrrolidone with polyamide acids (the precursors of polyimides); etc. A particular fugitive plasticizer which is often used with the polyimide precursors is 40 parts of N-methyl pyrrolidone, 40 parts of dimethylacetamide and 20 parts of toluene.

Various techniques can be used to prepare the plasticized polymers, depending upon the form in which the particular polymer precursor is available (e.g. whether as a dry powder, as pellets, as a solution in an organic solvent, etc.). If the polymer precursor is available in dry (100 percent solids) form, it can usually be allowed to equilibrate in the presence of the fugitive plasticizer. If it is available as a solution, any excess solvent can be removed and the remaining solvent utilized as the fugitive plasticizer or the solvent can be replaced by another which is more suitable.

For example, the precursor polyamide acids for certain of the preferred polyimides are available as low solids (e.g. 10–20 percent) solutions of the polyamide acids in solvents. These can be concentrated to 30 to 65 percent (preferably from 40 to 50 percent) solids by the removal of some of the solvent, the remaining solvent serving as the fugitive plasticizer.

The excess solvent can be removed by heating at a tempertaure lower than required to cure the polymer, preferably at a reduced pressure. Precipitation of the dilute solution, e.g. into acetone followed by vacuum drying can also be used. A particularly satisfactory technique of concentrating the polyamide acid solution is to coat it onto a temporary carrier such as polytetrafluoroethylene and heat at a temperature below that required for imidization (e.g. to 90° C.) until the desired amount of solvent has been evaporated. The concentrated polymer can then be removed from the carrier.

The electrically insulating inorganic flakes (which can ge thought of as fillers) of the products of the invention preferably have resistivities greater than about $10^8$ ohm-cm. Ordinarily, they are of mica or glass, mica being preferred. Electrical grade micas such as natural trisilicic micas (e.g. phlogopite and muscovite) and synthetic tetrasilicic fluorine-containing micas are particularly good.

The sheets of the invention which contain mica or glass are generally translucent or, in some cases, may be transparent (e.g. if the refractive indices of the flakes and polymer essentially match). The ratio of the maximum dimensions of the individual platelets or flakes to the minimum dimensions thereof is at least five and ordinarily ten or more and sometimes at least 50.

In addition to the flakes, other fillers (such, for example, as talc, silica an/or other inorganic pigments, reinforcing agents, etc.) may be included in the compositions of the invention.

The relative proportions of the flakes and polymer solids in the compositions of the invention are determined by their electrical, mechanical and processing properties. Thus, a ratio of less than about 15 parts of flakes and more than 85 parts of polymer solids has been found to result in a composition of considerably inferior electrical properties (particularly corona resistance). On the other hand, compositions containing more than 80 parts of flakes and less than 20 parts of polymer solids provide compositions with relatively poor mechanical and processing properties, e.g. they tend to be weak and brittle.

The preferred sheets of the invention (both green and hardened) contain from about 35 to 85 parts of polymer and 65 to 15 parts of the inorganic flakes since these sheets have superior mechanical properties to those having greater proportions of the flakes. The most preferred compositions are those containing from about 60 to 80 parts of the polymer solids and 40 to 20 parts of the flakes. It is these sheets which combine a maximum of flexibility and toughness (as well as conformability in the case of the green sheets) with maximum resistance to corona breakdown.

Regardless of how large the particles originally charged are, the flakes in the products of the invention are generally not more than about 80 microns, ordinarily from about 2 to 80 microns (although minor amounts, usually less than about 10 percent by weight can be outside this range). The size reduction (if larger flakes are originally charged) occurs during processing.

As noted previously, the flakes in the sheets of the invention are substantially all oriented essentially in the planes of the sheets. Thus, 75 percent at least, and ordinarily a much larger percentage, e.g. 95 percent or more, of the flakes are within 25 degrees of the sheet planes. Preferably, the flakes are within 10 degrees of the sheet planes. This orientation can be determined by known X-ray diffraction methods such, for example, as described hereinafter. When X-ray diffraction techniques are utilized there is a minor amount of the material being analyzed which will often be undetectable. These undetectable flakes, however, have approximately the same average orientation as the major detectable portion and are so considered.

Pressure-sensitive adhesives can also be applied to the sheets thereby forming pressure-sensitive tapes. Normally, but not necessarily, the sheets are hardened prior to application of the adhesive. The tapes are then conveniently applied to conductors, electrical components, etc. In some cases, the pressure-sensitive adhesive may be removed after application by a high temperature heat cycle or over a period of time by the ambient high temperature of use of the material. Preferably, however, a high temperature resistant adhesive is utilized. Primers and/or low adhesion backsizes may be used in conjunction with the pressure-sensitive adhesives in manners known to the art, or, alternatively, the pressure-sensitive tapes may be interwound with low adhesion interliners if necessary.

Among the various types of pressure-sensitive adhesives which can be used in the tapes of the present invention are those based on rubbery butadiene-styrene copolymers and oil soluble heat-reactive phenol-aldehyde resins; natural rubber base pressure-sensitive adhesives; polyacrylate base pressure-sensitive adhesives; polymerized chloroprene-chlorinated diphenyl pressure-sensitive adhesives, natural rubber- buna S-rubber type pressure-sensitive adhesives; and silicone-type pressure-sensitive adhesives. Such pressure-sensitive adhesives are known to the art and of themselves form no part of this invention. The silicone-type adhesives are preferred since they are normally resistant to high temperatures.

Suitable pressure-sensitive silicone adhesives for the practice of this invention are those which comprise a mixture of (1) from 40 to 75 percent by weight of a benzene soluble resin copolymer of $SiO_2$ units and $SiR_3O_{1/2}$ units where R is selected from the group consisting of methyl, ethyl, propyl, vinyl and phenyl radicals, at least 90 percent of the total R radicals being aliphatic and in which copolymer the ratio of $R_3SiO_{1/2}$ units to $SiO_2$ units is from 0.6:1 to 0.9:1, inclusive, and (2) 25 to 60 percent of a diorganopolysiloxane having the general formula R′SiO, where R′ is selected from the group consisting of methyl, ethyl, vinyl and phenyl radicals, at least 50 percent of the R′ radicals being aliphatic and having a viscosity of at least 1,000,000 centistokes at 25° C.

The following examples are offered to furnish a better understanding of the present invention, and are not to be construed as in any way limiting thereof. While the examples are limited in the polymers, fugitive plasticizers and inorganic fillers utilized, it should be understood that other materials of the previously defined types can be treated in essentially analogous manners. All parts are by weight unless otherwise specifically indicated. The word "mil" herein indicates .001 inch.

EXAMPLE 1

An 11 percent solution of the polyamide acid of substantially equimolar amounts of purified pyromellitic dianhydride (PMDA) and oxydianiline, i.e. 4,4′-diamino diphenyl ether (ODA) in a fugitive plasticizer which is a mixture of 40 parts of N-methyl pyrrolidone, 40 parts of dimethylacetamide and 20 parts of toluene is utilized. The following are properties of the polyimide prepared from this polyamide acid:

Vicat softening point (° C.) _____ Above 400
Elastic modulus, p.s.i. × $15^{-5}$ _____ 3.7
Elongation (percent) _____ 35
Tensile strength, p.s.i. × $^{-4}$ _____ 1.5
T.G.A. weight loss point ° C.[1] _____ 562

[1] This is the T.G.A. 10% weight loss point in flowing nitrogen at a heating rate of 2.5° C. per minute using a 3 to 10 mil film.

The previously described solution of PMDA and ODA is coated on a temporary carrier web (e.g. Teflon) to a thickness of about 20 mils and run into a 75° C. oven for 7½ minutes and then into a 95° C. oven for 18 minutes. The resulting film is 4 to 5 mils in thickness and the ratio of polymer solids to fugitive plasticizer is about 1:1. The material is then removed from the carrier web, milled until homogenous on a rubber mill at room temperature or slightly above (not greater than about 65° C.) and mica flakes having a particle size range of 60 to 550 microns are added, the ratio of mica solids to polymer solids in the mixture being 15:85. Milling is continued until this mixture is homogenous (the mica flakes being individually wet and surrounded by the plasticized polymer over substantially their entire surfaces). The material is then removed from the rubber mill in a sheet about 50 mils thick. This sheet is placed between sheets of polytetrafluoroethylene and those in turn are placed between aluminum sheets. The whole is heated to 90–95° C. and pressed at a ram pressure of 10,000 p.s.i. to form a flexible, pliable, translucent green sheet about 5 mils (125 microns) in thickness.

Samples of this green sheet are then cured to convert the polyamide acid to the polyimide and remove any remaining fugitive plasticizer. The curing cycle is 2 hours at 200° F., 2 hours at 300° F. and 1 hour at 500° C.

EXAMPLES 2–11

These examples are prepared in the same way as Example 1 (using the same polyamide acid and fugitive plasticizer) except that varying amounts of mica of several different particle sizes are milled into the polymer solution on the rubber mill. The relative amounts of polymer solids and mica and the mica particle size charged in each of these lots are given in the following table:

| | | Mica | |
|---|---|---|---|
| Example | Polymer solids, parts [1] | Parts | Particle size charged, microns |
| 2 | 80 | 20 | 60–550 |
| 3 | 75 | 25 | 60–550 |
| 4 | 70 | 20 | 60–550 |
| 5 | 65 | 35 | 60–550 |
| 6 | 60 | 40 | 2–80 |
| 7 | 60 | 40 | 60–550 |
| 8 | 60 | 40 | 1500–10,000 |
| 9 | 60 | 40 | [2] 20,000 |
| 10 | 55 | 45 | 60–550 |
| 11 | 20 | 80 | 60–550 |

[1] Based upon final polymer solids.
[2] Or more.

The material in each of these examples is then removed from the rubber mill, hot pressed to form the flexible, pliable, conformable, green sheet and cured in the same way as Example 1.

Additional larger lots of sheets of Examples 5, 7 and 10 are prepared as follows:

The 11 percent solution of the polyamide acid and fugitive plasticizer is mixed with the mica, coated on the carrier web and the plasticizer is partially stripped, e.g. until the ratio of polymer solids to fugitive plasticizer is about 1:1. The mixture is milled until homogenous, removed from the mill and calendered into 6 mil sheets at a temperature of from about 25 to 50° C. The resulting flexible, pliable, conformable green sheets are dimensionally restrained by placing them between two rectangular curing frames (in order to obtain additional flatness in the final films) and cured using the same heating cycle as in Example 1 to form the hardened sheets. Although there is some variation, the hardened sheets of these examples are generally from about 4 to 5 mils in thickness.

EXAMPLE 12

The polymer utilized in this example is a polyamide acid having the following repeating unit:

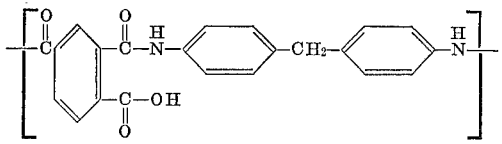

The following are properties of the polyamide prepared from this polyamide acid (the tests being run as in Example 1):

| | |
|---|---|
| Vicat softening point (° C.) | 425 |
| Elastic modulus, p.s.i.×$10^{-5}$ | 2.0 |
| Elongation (percent) | 12 |
| Tensile strength, p.s.i.×$10^{-3}$ | 12.5 |
| T.G.A. weight loss point ° C. | 466 |

The precursor polymer in dry form is allowed to equilibrate in the presence of dimethylacetamide at 65° C. for about 16 hours, the ratio of polymer solids to fugitive plasticizer being about 40:60. The mixture is then milled and mica is added, the relative amounts of polymer solids and mica being 60:40 and the particle size range of the added mica being 60–550 microns. The homogenous mixture is then removed from the mill and pressed and heated in the same way as Examples 1–11.

EXAMPLE 13

The polymer utilized in this example is a polyether, specifically poly (2,6-dimethyl-p-phenylene oxide) available from the General Electric Company. The following are properties of this polymer (the tests being run as in Example 1):

| | |
|---|---|
| Vicat softening point (° C.) | 191 |
| Elastic modulus, p.s.i.×$10^{-5}$ | 2.1 |
| Elongation (percent) | 65 |
| Tensile strength, p.s.i.×$10^{-3}$ | 8.1 |
| T.G.A. weight loss point ° C. | 430 |

The polymer is allowed to equilibrate in the presence of toluene (the fugitive plasticizer) for about 16 hours at 65° C., the ratio of polymer solids to plasticizer being about 50:50. The mixture is then milled and mica is added, the relative amounts of polymer solids and mica being 60:40 and the particle size range of the added mica being 60–550 microns. The homogenous mixture is removed from the mill and pressed to form the green sheet and heated to form the hardened sheet in the same way as Examples 1–11.

EXAMPLE 14

The polymer utilized in preparing Example 14 is a polysulfone which has the repeating unit:

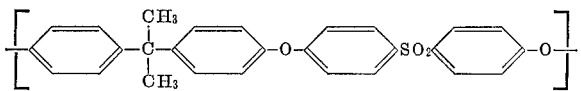

and is available from the Union Carbide Corporation. The following are properties of this polymer (the tests being run as in Example 1):

| | |
|---|---|
| Vicat softening point (° C.) | 186 |
| Elastic modulus, p.s.i.×$10^{-5}$ | 2.3 |
| Elongation (percent) | 55 |
| Tensile strength, p.s.i.×$10^{-3}$ | 8.4 |
| T.G.A. weight loss point ° C. | 490 |

The polymer is allowed to equilibrate (stand) in the presence of dimethylacetamide (the fugitive plasticizer) for about 16 hours at 65° C., the ratio of polymer solids to plasticizer being about 50:50. The mixture is then milled and mica is added, the relative amounts of polymer solids and mica being 60:40 and the particle size range of the added mica being 60–550 microns. The homogenous mixture is then removed from the mill and pressed to form the green sheet and heated in the same way as Examples 1–11 to form the hardened sheet.

Another polysulfone which is valuable in the preparation of sheets of the invention is prepared as follows:

A mixture of 35.6 g. of p,p′-biphenyl disulfonylchloride, 17.0 g. of diphenyl ether and 36 g. of Arochlor 1248 (50% chlorinated biphenyl) is placed in a 250 ml. flask and heated to about 180° C. to obtain a uniform melt. The mixture is then allowed to cool to about 150° C. and after addition of 40 mg. of sublimed ferric chloride is heated for 1 hour at temperatures gradually increasing to 200° C. and held at that temperature for 15 hours (the evolved hydrogen chloride being discharged to a water trap). The product is dissolved in an excess of hot dimethylacetamide and recovered by pouring the hot solution into 2 l. of methanol and filtering the precipitate. After washing with hot water and drying, 44 g. of poly (biphenyl-diphenyl ether) sulfone copolymer is obtained. The polymer has a melting range of 310–330° C. and is soluble in solvents such as dimethylformamide, dimethyl sulfoxide and pyridine. The inherent viscosity is 0.40 and the polymer contains about 33 percent of —O— linking groups. Hardened sheets of the invention containing 60 parts of polymer solids and 40 parts of mica are prepared from this polymer in the same way as Example 14.

A summary of the compositions of the hardened sheets of Examples 1–14 is presented in the following table for convenience.

| | Polymer | | Mica, parts by weight |
|---|---|---|---|
| Example No. | Parts by weight [1] | Type | |
| 1 | 85 | Polyimide | 15 |
| 2 | 80 | ---do--- | 20 |
| 3 | 75 | ---do--- | 25 |
| 4 | 70 | ---do--- | 30 |
| 5 | 65 | ---do--- | 35 |
| 6 | 60 | ---do--- | 40 |
| 7 | 60 | ---do--- | 40 |
| 8 | 60 | ---do--- | 40 |
| 9 | 60 | ---do--- | 40 |
| 10 | 55 | ---do--- | 45 |
| 11 | 20 | ---do--- | 80 |
| 12 | 60 | Polyamide | 40 |
| 13 | 60 | Polyether | 40 |
| 14 | 60 | Polysulfone | 40 |

[1] Based upon final polymer solids.

EXAMPLE 15

Corona life tests of a number of the compositions of the invention and the controls are run on these sheets utilizing the following procedure: The sample to be tested (in sheet form) is laid upon a grounded flat copper plate. A high voltage electrode (a ¼″ by ½″ rectangular plate of transformer core iron) is placed on top of the test film. If desired, several individual sheets can be stacked to provide a thicker test sample, the total thickness being recorded. The copper plate and the sheet being tested both extend beyond the periphery of the high voltage electrode on all sides. The corona discharges occur largely from the edges of the high voltage electrode to the test sheet. Five replicates are run on each test. The tests are run at 1,060 cycles per second (c.p.s.), the temperatures and electrical stresses being varied from test to test. The effect of the relative humidity on the test run at 25° C. is eliminated by running those tests at 0 percent relative humidity. At the higher test temperature, the effect of the humidity is negligible and those tests are therefore run at ambient relative humidity. The test time to failure of the third (median) sample of each replicate set is recorded. The test time of this sample (the third to fail) is then converted to its equivalent time at 60 cycles per second by multiplying the observed test time by 17.7 (1060/60). The results obtained are as follows:

| Example number of film tested | Test designation | Temp., °C. | Thickness (mils) | Voltage stress | | Corona life time to failure (hours) | |
|---|---|---|---|---|---|---|---|
| | | | | Volts | Volts/mil | Measured 1,060 c.p.s. | Equiv. 60 c.p.s. |
| 1 | A | 25 | 25 | 2,500 | 100 | 1,1000 | 19,400 |
| 2 | B | 25 | 25 | 2,500 | 100 | ¹ 1,837 | ¹ 32,200 |
| 3 | C | 25 | 25 | 2,500 | 100 | ¹ 1,975 | ¹ 34,900 |
| 7 | D | 25 | 25 | 2,500 | 100 | ¹ 1,770 | ¹ 31,200 |
| 7 | E | 25 | 5 | 1,500 | 300 | 35 | 620 |
| 7 | F | 132 | 7 | 1,500 | 214 | 34.5 | 609 |
| 7 | G | 132 | 25 | 2,500 | 100 | 510 | 9,000 |
| 7 | H | 132 | 25 | 1,500 | 60 | 3,150 | ¹ 55,600 |
| 10 | I | 25 | | | 100 | ¹ 1,944 | ¹ 33,900 |

¹ Indicates tests in progress when readings made. The actual test times at failure will thus be longer than indicated.

The corona lives of the compositions of various examples hereof are compared with those of control lots in the following table. The control values are obtained from tests of comparable sheets of the same polymer which contain no filler.

| Test designation | Percent mica | Corona life equiv. 60 c.p.s. (hrs.) | | Percent higher corona life, filled polymer over unfilled polymer |
|---|---|---|---|---|
| | | Control (unfilled polymer) | Polymer with filler | |
| A | 15 | 1,700 | 19,400 | 1,040 |
| B | 20 | 1,700 | ¹ 32,200 | ¹ 1,800 |
| C | 25 | 1,700 | ¹ 34,900 | ¹ 1,950 |
| D | 40 | 1,700 | ¹ 31,200 | ¹ 1,740 |
| E | 40 | 206 | 620 | 201 |
| F | 40 | 150 | 609 | 306 |
| G | 40 | 560 | 9,000 | 1,500 |
| H | 40 | 2,000 | ¹ 55,600 | ¹ 2,680 |
| I | 45 | 1,700 | ¹ 33,900 | ¹ 1,900 |

¹ Indicates tests in progress when readings made. The actual test values at failure will thus be higher than indicated.

EXAMPLE 16

The dielectric constants of the compositions of the invention are high, indicating intimate contact between the filler platelets and the polymer. Thus, the cured material of Example 7 (60 parts polyimide and 40 parts mica) has a dielectric constant of 4.3 at 150° C. and 100 c.p.s.

EXAMPLE 17

The dissipation factors of these compositions at elevated temperatures are very low thus demonstrating their excellent thermal oxidative stability. Thus, for example, the hardened material of Example 7 has a dissipation factor of less than 1% at 200° C. in air. The dissipation factor and dielectric constant test procedures have the ASTM number D-150-59T and are given in the 1964 ASTM Manual.

EXAMPLE 18

The fold endurance values of the hardened compositions of the invention in which the polymer is a polyimide are 100 cycles or more at a thickness of 100 microns. The MIT fold endurance test procedure is utilized to determine the value. It is as follows:

A test sample is prepared having a length of at least 1.9 cm., a width of 1.9 cm. (±0.1 cm.) and a thickness of approximately 0.1 millimeter. The test apparatus used is a product of the Tinius Olson Co. The sample is folded around a radius of curvature of 0.38 mm.±.015 mm. and is flexed 135° either side of the center point at 175 double folds (cycles) per minute under a load of 1.5 kgm. The test is run at 25° C.

The following lots are run using green sheets of Example 7 which have been additionally heated as indicated to form hardened sheets.

| Lot | Additional heat cycle | Cycle to break (average of 3 samples) |
|---|---|---|
| A | 1 hr. at 77° C., 1 hr. at 110° C., 2¼ hr. at 145° C., 1 hr. at 238° C. and 5 minutes at 316° C. | 320 |
| B | Same as Lot A plus an additional 13 minutes at 316° C. | 440 |
| C | Same as Lot B plus 5 minutes at 360° C. | 457 |

EXAMPLE 19

The orientation of the flakes in the sheets of the invention by X-ray diffraction can be determined by the following technique:

A photographic film is mounted vertically in a suitable instrument, the sheet of the invention to be tested is mounted beside it in a horizontal plane and an X-ray source is located so that the X-ray beam is directed to impinge on the edge of the test sheet, the diffraction pattern being recorded on the photographic film. Diffraction lines appearing as small arcs in the equatorial plane of the diffraction patterns are indicative of orientation.

The angles formed by the extremities of the arcs is 50° or less in all of the tested samples of the examples (e.g. of Example 7). Thus, substantially all of the platelets in the sheets are within 25° of the plane of the sheet.

EXAMPLE 20

Particle size distributions of mica in the green sheets of Examples 6–9 are determined as follows: The polyamide acid is removed from the mica particles of a sample of the green sheet of each example by washing with dimethylformamide, centrifuging and decanting. The mica particles are then dried in a vacuum oven at an elevated temperature.

The particle size ranges (considering the largest dimension of the particles) are determined microscopically as the "number percent greater than" at the 90 percent, 50 percent and 10 percent levels. Thus, under "90 percent greater than" a particle size is reported which is smaller than 90 percent (and larger than 10 percent) of the particles in the sample. The results are as follows, the particles generally being flat plates in each case.

| Example No. | Original particle size in microns ¹ | Final particle size in microns ² | | |
|---|---|---|---|---|
| | | 90% greater than— | 50% greater than— | 10% greater than— |
| 6 | 2–80 | 3.1 | 8 | 25 |
| 7 | 60–550 | 3.5 | 15 | 31 |
| 8 | 1,500–10,000 | 1.5 | 8 | 33 |
| 9 | 20,000 or more | 2.3 | 11 | 32 |

¹ As charged, range.
² In green sheet, number percent greater than.

Thus the particle sizes in the sheets tested are approximately the same regardless of the particle sizes of the filler originally charged.

EXAMPLE 21

A hardened sheet of Example 7 which has a thickness of about 5 mils is knife coated with a solution of a silicone pressure-sensitive adhesive, defined hereinbefore, dispersed (50% solids) in xylene and containing ½ to 2 percent of benzoyl peroxide based on adhesive solids. The coating is sufficiently thick to provide a dry coating weight of 12–15 grains per 4″ x 6″ (i.e. about 5 to $6 \times 10^{-3}$ grams per cm.$^2$). The structure is heated to about 95° C. for 5 minutes to evaporate the solvent and thereafter heated for 5 minutes at about 175° C. to partially cure the adhesive. The tape is slit into narrow widths and wound into rolls. A low adhesion interliner can be used in the rolls although this is not generally required since no offsetting of adhesive ordinarily occurs during unwinding. This tape is valuable in the insulation of electrical conductors, since it adheres tenaciously in the position in which applied and requires no further heating or other treatment. It can be used under conditions of high temperature and high electrical voltages.

What is claimed is:

1. A tough, flexible sheet which comprises:
   (a) from about 20 to 85 parts of a hardened wholly synthetic polymer having a highly aromatic structure containing hetero linkages, a softening temperature greater than 100° C. and a weight loss as determined by thermogravimetric analysis in flowing nitrogen with a temperature increase of 2½° C. per minute of less than 10% at 400° C. and being selected from aromatic polyimides, polyamides, polysulfones and polyethers and
   (b) from about 80 to 15 parts of electrically insulating inorganic flakes uniformly dispersed in the polymer, the flakes being substantially oriented in the plane of the sheet and each flake being surrounded and intimately contacted by the polymer.

2. A tough, flexible sheet which comprises:
   (a) from about 20 to 85 parts of a hardened highly aromatic polysulfone having a softening temperature greater than 100° C. and a weight loss as determined by thermogravimetric analysis in flowing nitrogen with a temperature increase of 2½° C. per minute of less than 10% at 400° C.
   (b) from about 80 to 15 parts of electrically insulating inorganic flakes uniformly dispersed in the polymer, the flakes being substantially oriented in the plane of the sheet and each flake being surrounded and intimately contacted by the polymer.

3. A tough, flexible sheet which comprises:
   (a) from about 20 to 85 parts of a hardened highly aromatic polyether having a softening temperature greater than 100° C. and a weight loss as determined by thermogravimetric analysis in flowing nitrogen with a temperature increase of 2½° C. per minute of less than 10% at 400° C.
   (b) from about 80 to 15 parts of electrically insulating inorganic flakes uniformly dispersed in the polymer, the flakes being substantially oriented in the plane of the sheet and each flake being surrounded and intimately contacted by the polymer.

4. A tough, flexible sheet according to claim 3 wherein the polyether is a poly(phenylene oxide).

5. A tough, flexible sheet which comprises:
   (a) from about 20 to 85 parts of a polyimide having a softening temperature greater than 100° C. and a weight loss as determined by thermogravimetric analysis in flowing nitrogen with a temperature increase of 2½° C. per minute of less than 10% at 400° C.
   (b) from about 80 to 15 parts of electrically insulating inorganic flakes uniformly dispersed in the polymer, the flakes being substantially oriented in the plane of the sheet and each flake being surrounded and intimately contacted by the polyimide.

6. A tough, flexible sheet which comprises:
   (a) from about 20 to 85 parts of a polyimide having a softening temperature greater than 100° C. and a weight loss as determined by thermogravimetric analysis in flowing nitrogen with a temperature increase of 2½° C. per minute of less than 10% at 400° C.
   (b) from about 80 to 15 parts of mica flakes uniformly dispersed in the polymer, the flakes being substantially oriented in the plane of the sheet and each flake being surrounded and intimately contacted by the polyimide.

7. A tough, flexible sheet which comprises:
   (a) from about 20 to 85 parts of a polyimide of pyromellitic dianhydride and oxydianiline having a softening temperature greater than 100° C. and a weight loss as determined by thermogravimetric analysis in flowing nitrogen with a temperature increase of 2½° C. per minute of less than 10% at 400° C.
   (b) from about 80 to 15 parts of electrically insulating inorganic flakes uniformly dispersed in the polymer, the flakes being substantially oriented in the plane of the sheet and each flake being surrounded and intimately contacted by the polyimide.

8. A tough, flexible, conformable intermediate sheet capable of being subsequently hardened which comprises:
   (a) from about 20 to 85 parts, based on polymer solids, of a plasticized wholly synthetic polymer having a highly aromatic structure containing hetero linkages, an unfilled viscosity greater than about $10^5$ poises at 25° C. and a solids content from about 30 to 65 percent, the remainder being a fugitive plasticizer having a boiling point of from about 40 to 300° C., the synthetic polymer when hardened having a softening temperature greater than 100° C. and a weight loss as determined by thermogravimetric analysis in flowing nitrogen with a temperature increase of 2½° C. per minute of less than 10° at 400° C. and being selected from aromatic polyimides, polyamides, polysulfones and polyethers and
   (b) from about 80 to 15 parts of electrically insulating inorganic flakes uniformly dispersed in the polymer, the flakes being substantially oriented in the plane of the sheet and each flake being surrounded and intimately contacted by the polymer.

9. An intermediate sheet according to claim 8 wherein the polymer is a polysulfone.

10. An intermediate sheet according to claim 8 wherein the polymer is a polyether.

11. An intermediate sheet according to claim 10 wherein the polyether is a poly(phenylene oxide).

12. A tough, flexible, conformable intermediate sheet capable of being subsequently hardened which comprises:
   (a) from about 20 to 85 parts, based on polymer solids, of a plasticized polyamide acid having an unfilled viscosity greater than about $10^5$ poises at 25° C. and a solids content from about 30 to 65 percent, the remainder being a fugitive plasticizer having a boiling point of from about 40 to 300° C., the polyamide acid being capable of being hardened to form a polyimide having a softening temperature greater than 100° C. and a weight loss as determined by thermogravimetric analysis in flowing nitrogen with a temperature increase of 2½° C. per minute of less than 10% at 400° C. and
   (b) from about 80 to 15 parts of electrically insulating inorganic flakes uniformly dispersed in the polymer, the flakes being substantially oriented in the plane of the sheet and each flake being surrounded and intimately contacted by the polymer.

13. An intermediate sheet according to claim 12 wherein the flakes are mica.

14. An intermediate sheet according to claim 12 wherein the polymer is a reaction product of pyromellitic dianhydride and oxydianiline.

15. The process which comprises:
   (a) milling together at moderate temperature 20 to 85 parts, based on polymer solids, of a temporarily plasticized wholly synthetic polymer having a highly aromatic structure containing hetero linkages, a viscosity greater than $10^5$ poises at 25° C. and 80 to 15 parts of inorganic electrically insulating flakes, the plasticized polymer comprising
  (1) from about 30 to 65 parts of a wholly synthetic polymer having a softening temperature when hardened greater than 100° C. and a weight loss when hardened as determined by thermogravimetric analysis in flowing nitrogen with a temperature increase of 2½° C. per minute of less than 10% at 400° C. and being selected from aromatic polyimides, polyamides, polysulfones and polyethers and
  (2) from about 70 to 35 parts of a fugitive plasticizer which has a boiling point from about 40° to 300° C. and which forms a soft, pliable, viscous, homogenous mass with the polymer,
(b) continuing milling until the individual flakes are uniformly dispersed in and substantially completely surrounded and wet by the plasticized polymer,
(c) removing the filled mass from the mill,
(d) compressing the mass into a sheet in which substantially all of the flakes are oriented essentially in the plane of the sheet and
(e) subjecting the sheet to a heat cycle to harden it.

16. A process according to claim 15 wherein the polymer is a polysulfone.

17. A process according to claim 15 wherein the polymer is a polyether.

18. A process according to claim 17 wherein the polyether is a poly(phenylene oxide).

19. The process which comprises:
(a) milling together at moderate temperature 20 to 85 parts, based on polymer solids, of a temporarily plasticized polymer having a viscosity greater than $10^5$ poises at 25° C. and 80 to 15 parts of inorganic electrically insulating flakes, the plasticized polymer comprising
  (1) from about 30 to 65 parts of a polyamide acid capable of being hardened to form a polyimide having a softening temperature greater than 100° C. and a weight loss as determined by thermogravimetric analysis in flowing nitrogen with a temperature increase of 2½° C. per minute of less than 10% at 400° C. and
  (2) from about 70 to 35 parts of a fugitive plasticizer which has a boiling point from about 40° to 300° C. and which forms a soft, pliable, viscous, homogenous mass with the polymer,
(b) continuing milling until the individual flakes are uniformly dispersed in and substantially completely surrounded and wet by the plasticized polymer,
(c) removing the filled mass from the mill,
(d) pressing the mass into a sheet in which substantially all of the flakes are oriented essentially in the plane of the sheet and
(e) subjecting the sheet to a heat cycle to harden it and convert it to the polyimide.

20. A process according to claim 19 wherein the flakes are mica.

21. A process according to claim 19 wherein the polymer is a reaction product of pyromellitic dianhydride and oxydianiline.

22. A pressure-sensitive adhesive insulating tape wound upon itself in roll form and comprised of a tough, flexible sheet which comprises:
(a) from about 20 to 85 parts of a hardened wholly synthetic polymer having a highly aromatic structure containing hetero linkages, a softening temperature greater than 100° C. and a weight loss as determined by thermogravimetric analysis in flowing nitrogen with a temperature increase of 2½° C. per minute of less than 10% at 400° C. and being selected from aromatic polyimides, polyamides, polysulfones and polyethers and
(b) from about 80 to 15 parts of electrically insulating inorganic flakes uniformly dispersed in the polymer, the flakes being substantially oriented in the plane of the sheet and each flake being surrounded and intimately contacted by the polymer
and an eucohesive normally tacky and pressure-sensitive adhesive coating united to the inner face of the sheet backing.

23. A pressure-sensitive adhesive tape according to claim 22 wherein the polymer is a polysulfone.

24. A pressure-sensitive adhesive tape according to claim 22 wherein the polymer is a polyether.

25. A pressure-sensitive adhesive tape according to claim 24 wherein the polyether is a poly(phenylene oxide).

26. A pressure-sensitive adhesive insulating tape wound upon itself in roll form and comprised of a tough, flexible sheet which comprises:
(a) from about 20 to 85 parts of a polyimide having a softening temperature greater than 100° C. and a weight loss as determined by thermogravimetric analysis in flowing nitrogen with a temperature increase of 2½° C. per minute of less than 10% at 400° C. and
(b) from about 80 to 15 parts of electrically insulating inorganic flakes uniformly dispersed in the polymer, the flakes being substantially oriented in the plane of the sheet and each flake being surrounded and intimately contacted by the polyimide
and an eucohesive normally tacky and pressure-sensitive adhesive coating united to the inner face of the sheet backing.

27. A pressure-sensitive adhesive tape according to claim 26 wherein the flakes are mica.

28. A pressure-sensitive adhesive tape according to claim 26 wherein the polymer is a reaction product of pyromellitic dianhydride and oxydianiline.

References Cited

UNITED STATES PATENTS

| | | | |
|---|---|---|---|
| 2,175,715 | 10/1939 | Denning | 92—55 |
| 2,454,210 | 11/1948 | Runk et al. | 260—40 |
| 2,477,791 | 8/1949 | Foster et al. | 260—40 |
| 2,459,018 | 1/1949 | DeMonte et al. | 260—37 |
| 2,981,980 | 5/1961 | Brown et al. | 260—37 |
| 2,984,590 | 5/1961 | Anderson | 117—232 |
| 3,024,701 | 3/1962 | Marks et al. | 260—40 |
| 3,028,266 | 4/1962 | Larsh | 117—232 |
| 3,087,912 | 4/1963 | Wagner et al. | |
| 3,234,181 | 2/1966 | Olivier. | |

MORRIS LIEBMAN, Primary Examiner

L. T. JACOBS, Assistant Examiner

U.S. Cl. X.R.

117—122

UNITED STATES PATENT OFFICE
CERTIFICATE OF CORRECTION

Patent No. 3,520,845      Dated July 21, 1970

Inventor(s) James J. McKeown and Michael E. Toner

It is certified that error appears in the above-identified patent and that said Letters Patent are hereby corrected as shown below:

Column 3, Line 13  "synthetci" should be -- synthetic --

Column 3, Line 16  "niorganic" should be -- inorganic --

Column 7, Line 69  "p.s.i. x $15^{-5}$" should be
-- p.s.i. x $10^{-5}$ --

Column 7, Line 71 "x $^{-4}$" should be -- x $10^{-4}$ --

SIGNED AND
SEALED
NOV 3 1970

(SEAL)
Attest:

Edward M. Fletcher, Jr.
Attesting Officer

WILLIAM E. SCHUYLER, JR.
Commissioner of Patents